(12) United States Patent
Kaneda (10) Patent No.: US 10,191,440 B2
(45) Date of Patent: Jan. 29, 2019

(54) IMAGE FORMING APPARATUS, CONTROL METHOD, AND STORAGE MEDIUM STORING PROGRAM

(71) Applicant: CANON KABUSHIKI KAISHA, Tokyo (JP)

(72) Inventor: Kanako Kaneda, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/787,860

(22) Filed: Oct. 19, 2017

(65) Prior Publication Data

US 2018/0120756 A1    May 3, 2018

(30) Foreign Application Priority Data

Nov. 2, 2016 (JP) ................. 2016-215564

(51) Int. Cl.
| | |
|---|---|
| *G03G 15/08* | (2006.01) |
| *G03G 21/00* | (2006.01) |
| *G03G 15/00* | (2006.01) |
| *H04N 1/00* | (2006.01) |
| *H04N 1/29* | (2006.01) |
| *H04N 1/60* | (2006.01) |
| *H04N 1/405* | (2006.01) |

(52) U.S. Cl.
CPC ......... *G03G 21/0064* (2013.01); *G03G 15/50* (2013.01); *G03G 15/553* (2013.01); *G03G 21/0094* (2013.01); *H04N 1/00034* (2013.01); *H04N 1/00058* (2013.01); *H04N 1/00068* (2013.01); *H04N 1/00909* (2013.01); *H04N 1/295* (2013.01); *H04N 1/6008* (2013.01); *G03G 21/0011* (2013.01); *H04N 1/405* (2013.01); *H04N 2201/0091* (2013.01)

(58) Field of Classification Search
CPC ............ G03G 15/065; G03G 15/5058; G03G 15/0806; G03G 15/5008; G03G 15/0808
USPC .......................................................... 399/53
See application file for complete search history.

(56) References Cited

U.S. PATENT DOCUMENTS

| | | | | |
|---|---|---|---|---|
| 5,946,521 A * | 8/1999 | Budnik | ............. | G03G 15/5033 399/24 |
| 2012/0148270 A1* | 6/2012 | Yamada | ............. | G03G 15/0121 399/27 |
| 2014/0240382 A1* | 8/2014 | Sato | ............. | B41J 3/60 347/6 |

(Continued)

FOREIGN PATENT DOCUMENTS

JP    2006-126753 A    5/2006

*Primary Examiner* — Walter L Lindsay, Jr.
*Assistant Examiner* — Frederick Wenderoth
(74) *Attorney, Agent, or Firm* — Venable LLP (57) ABSTRACT

An image forming apparatus, based on print target image data, obtains a video count of a developer unit that forms an image on a photoconductor for each of regions divided in a scanning direction of a laser that exposes the photoconductor. Also after obtaining the video count, halftone processing is performed on the image data. Based on the obtained video count, patch data for cleaning the photoconductor corresponding to each region is generated. The developer unit is controlled to execute image formation based on image data for which the halftone processing is performed, and to execute image formation based on the generated patch data.

9 Claims, 9 Drawing Sheets

(56) References Cited

U.S. PATENT DOCUMENTS

2014/0255052 A1\* 9/2014 Fujiwara ............ G03G 15/5058
399/49

\* cited by examiner

FIG. 1A

DIRECTION OF CONVEYANCE

| REGION | VIDEO COUNT ACCUMULATED VALUE | PATCH GENERATION FLAG | PATCH DENSITY |
|---|---|---|---|
| 1 | 0 | 1 | 100% |
| 2 | 1000 | 1 | 50% |
| 3 | 2000 | 1 | 30% |
| 4 | 10000 | 0 | 0% |
| 5 | 3000 | 1 | 10% |
| ... | ... | ... | ... |
| 28 | 20000 | 0 | 0% |
| 29 | 2500 | 1 | 10% |
| 30 | 800 | 1 | 50% |
| 31 | 200 | 1 | 80% |
| 32 | 100 | 1 | 100% |

| REGION | VIDEO COUNT VALUE (PRESENT PAGE) | VIDEO COUNT VALUE (ACCUMULATED VALUE) | COUNT VALUE NOTIFICATION FLAG (0: NOT NOTIFY, 1: NOTIFY) |
|---|---|---|---|
| 1 | 0 | 0 | 1 |
| 2 | 10 | 10 | 0 |
| 3 | 20 | 20 | 1 |
| 4 | 500 | 500 | 0 |
| 5 | 300 | 300 | 1 |
| ... | ... | ... | ... |
| 28 | 1000 | 1000 | 0 |
| 29 | 120 | 120 | 1 |
| 30 | 40 | 40 | 0 |
| 31 | 10 | 10 | 1 |
| 32 | 5 | 5 | 0 |

FIG. 9B

| REGION | VIDEO COUNT VALUE (PRESENT PAGE) | VIDEO COUNT VALUE (ACCUMULATED VALUE) | COUNT VALUE NOTIFICATION FLAG (0: NOT NOTIFY, 1: NOTIFY) |
|---|---|---|---|
| 1 | 0 | 0 | 0 |
| 2 | 15 | 25 | 1 |
| 3 | 10 | 10 | 0 |
| 4 | 400 | 900 | 1 |
| 5 | 350 | 350 | 0 |
| ... | ... | ... | ... |
| 28 | 1200 | 2200 | 1 |
| 29 | 150 | 150 | 0 |
| 30 | 50 | 90 | 1 |
| 31 | 20 | 20 | 0 |
| 32 | 5 | 10 | 1 |

IMAGE FORMING APPARATUS, CONTROL METHOD, AND STORAGE MEDIUM STORING PROGRAM

BACKGROUND OF THE INVENTION

Field of the Invention

The present invention relates to an image forming apparatus that performs image formation by an electrophotographic method, a control method, and a storage medium storing a program.

Description of the Related Art

Image forming apparatuses comprising a developing unit for developing an electrostatic latent image formed on an image carrying body photoreceptor surface by toner in a powder developing agent are widely put into practical use. The surface of a photoconductor is uniformly charged by a charging unit, and an electrostatic latent image is formed by an exposure unit. On the electrostatic latent image formed on a photoconductor, images of each color such as yellow, magenta, cyan, and black, for example, are visualized by toner in a developing unit. The toner image is primary transferred to an intermediate transfer body that passes the photosensitive drum in contact therewith, and the primary transferred toner image is further secondary transferred to a print medium such as a sheet.

After transferring the toner image, residual toner and the like that adheres to the photoreceptor surface is removed by a cleaning unit. The cleaning unit is configured from a cleaning blade and a conveying screw, and the cleaning blade, by a pressure unit, is made to abut against the photoconductor at a predetermined angle and pressure, and recovers the toner remaining on the photoreceptor surface thereby. The photoconductor, after the residual toner is removed therefrom by the cleaning unit, returns to a charging step, and the sequence of image forming operations is repeated.

Generally, in a cleaning unit, when print processing for a predetermined number of pages completes, what is described above as adhering to the photoconductor surface is removed efficiently by adding, as a patch, a fixed amount or more of toner which acts as an abrasive for the photoconductor. In Japanese Patent Laid-Open No. 2006-126753 is disclosed a configuration in which a number of dots formed on a photoconductor in respective regions in a main scanning direction, which are set in advance, is counted, and the toner amount in the cleaning configuration is controlled based on the calculated count values.

In the technique disclosed in Japanese Patent Laid-Open No. 2006-126753, the number of dots formed on the photoconductor, specifically, a value based on image data after halftone processing is performed on input image is calculated. However, generally, the number of bits of image data after halftone processing is smaller than before the halftone processing. Accordingly, high precision cleaning control is difficult.

SUMMARY OF THE INVENTION

An aspect of the present invention is to eliminate the above-mentioned problems with the conventional technology. The present invention provides an image forming apparatus that realizes high precision cleaning control, a control method, and a storage medium storing a program.

The present invention in one aspect provides an image forming apparatus having a first controller and a second controller, the apparatus comprising: an obtainment unit configured to, based on print target image data, obtain a video count of a developer unit that forms an image on a photoconductor for each of regions divided in a scanning direction of a laser that exposes the photoconductor; a halftone processing unit configured to, after the video count is obtained by the obtainment unit, execute halftone processing on the image data; a generation unit configured to, based on the video count obtained by the obtainment unit, generate patch data for cleaning the photoconductor corresponding to each region; and a control unit configured to control the developer unit to execute image formation based on image data for which the halftone processing is executed by the halftone processing unit, and to execute image formation based on the patch data generated by the generation unit, wherein the video count obtained by the obtainment unit is communicated between the first controller which includes the obtainment unit and the second controller which includes the generation unit.

By virtue of the present invention, it is possible to realize high precision cleaning control.

Further features of the present invention will become apparent from the following description of exemplary embodiments with reference to the attached drawings.

DESCRIPTION OF THE EMBODIMENTS

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

[First Embodiment]

Figure 1A:
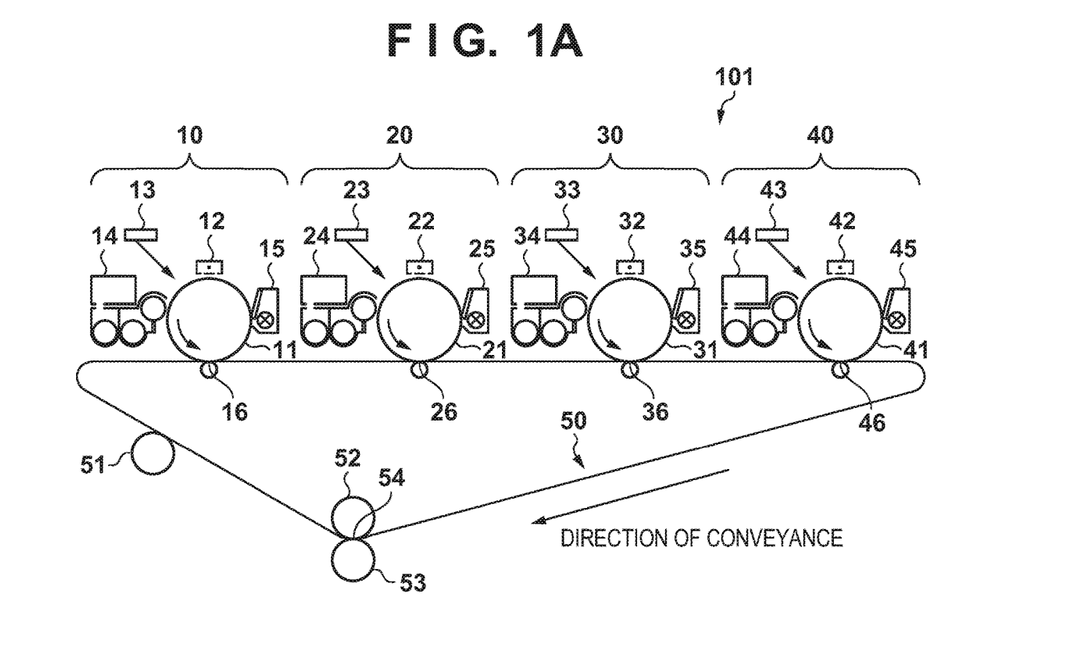
FIG. 1A and FIG. 1B are views illustrating a configuration in the periphery of a printing unit of an image forming apparatus.
Figure 1B:
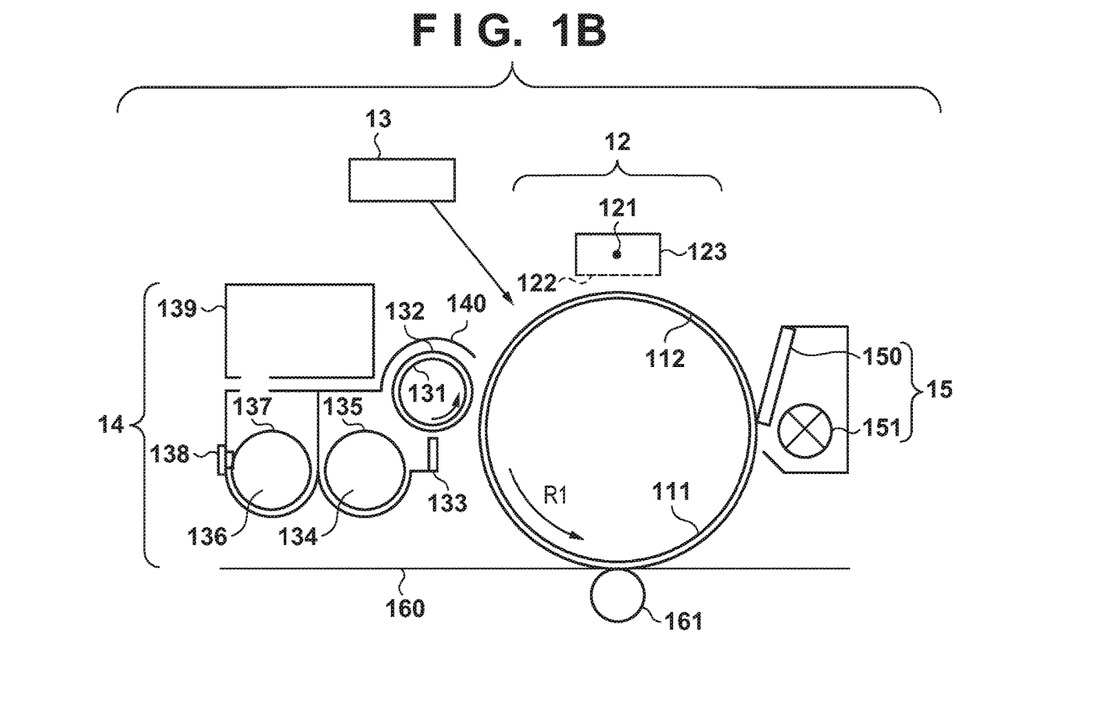

FIG. 1A and FIG. 1B are views illustrating a configuration in the periphery of a printing unit of an image forming apparatus in the present embodiment. Below, using FIG. 1A, an image forming operation in an image forming apparatus that uses an electrophotographic method is described. An image forming apparatus 101 is a full-color electrophotographic method image forming apparatus that has four photosensitive drums and uses an intermediate transfer body. Photoconductors 11, 21, 31, and 41 are arranged respectively on the processing units 10, 20, 30, 40 that form images of the colors yellow, magenta, cyan, and black respectively, and each photoconductor is configured to rotate freely in the arrow symbol direction. Furthermore, in the surroundings of the photoconductors 11, 21, 31, and 41, corona chargers 12, 22, 32, and 42 as a first charging unit, exposure apparatuses 13, 23, 33, and 43, and developing apparatuses 14, 24, 34, and 44 are respectively arranged sequentially. Also, cleaners 15, 25, 35, and 45 are arranged in the rotation direction for each photoconductor. Note that each process that acts on the photoconductors in image forming is controlled by a later described print controller 202. In FIG. 1A and FIG. 1B, the four colors of yellow, magenta, cyan, and black are configured, but there is no limitation to these four colors in particular, and a configuration may be added for a special color, for example.

FIG. 1B is a view illustrating a detailed configuration of each processing unit. Since the four processing units have the same configuration, a configuration related to the photoconductor 11 is described as a representative example. As illustrated in FIG. 1B, the processing unit comprises the photoconductor 11 as an image carrying body which is supported rotatably. The photoconductor 11 is a cylindrical electrophotographic photosensitive member whose basic configuration is an aluminum conductive substrate 111 and a photoconductive layer 112 formed in the outer surface thereof. In the center thereof is a supporting axis, and the configuration is such that it can be driven rotationally in the arrow symbol R1 direction about the supporting axis.

The corona charger 12 is arranged above the photoconductor 11. The corona charger 12 is configured to include a wire 121, a grid 122, and a shield member 123, and the surface of the photoconductor 11 is charged uniformly to a predetermined polarity and potential. The exposure apparatus 13 is arranged on the downstream side of the corona charger 12 in the rotation direction of the photoconductor 11. The exposure apparatus 13 scans while turning off/on a laser beam based on image data targeted for printing, and thereby an electrostatic latent image is formed on the photoconductor 11 on which the laser beam is irradiated.

The developing apparatus 14 arranged on the downstream side of the exposure apparatus 13 has a developing container 131 in which a two-component developer comprising toner and carrier (magnetic material) is accommodated. In an opening facing the photoconductor 11 of the developing container 131, a developing sleeve 132 is installed rotatably, and in the developing sleeve 132, a magnet roller 133 that carries toner on the developing sleeve 132 is fixedly arranged. A regulation blade 140 for regulating a developing agent carried on the developing sleeve 132 to form a thin developing agent layer is installed at a position above the developing sleeve 132 of the developing container 131. Also, a developing chamber 135 and a mixing chamber 137, which are separated, are arranged in the developing container 131, and screws 134 and 136, which are for mixing/conveying developing agent, are arranged there. Also, a replenishing chamber 139, in which toner for replenishment is accommodated, is arranged above the developing container 131. A developer density detection unit 138 is a sensor for detecting permeability, and is arranged at an upstream position in a direction of conveyance of developing agent of a mixing chamber 137 and an opening through which toner replenishment is performed.

When the toner formed in the thin developing agent layer is conveyed to the developing region facing the photoconductor 11, it is caused to spike out by the magnetic force of a main developing pole positioned in the developing region of the magnet roller 133 and thereby a magnetic brush is formed. Together with the scrubbing of the surface of the photoconductor 11 by this magnetic brush, toner adhering to the carrier that configures the spikes of the magnetic brush adheres to the electrostatic latent image exposure unit and is developed, and as a result, a toner image is formed on the photoconductor 11.

A transfer roller 161 is arranged below the photoconductor 11 on the downstream side of a developing apparatus 14. The transfer roller 161 is pressed to the surface of the photoconductor 11 via an intermediate transfer belt 160, and a primary transfer unit 16 is formed between the photoconductor 11 and the transfer roller 161. Primary transfer units 26, 36, and 46 respectively correspond to the other photoconductors 21, 31, and 41. Residual toner or the like that adheres on the surface of the photoconductor 11 after toner image transfer is removed by a cleaner 15. The cleaner 15 is configured to include a cleaning blade 150 and a conveying screw 151, and the cleaning blade 150 recovers toner that remains on the surface of the photosensitive drum 11. The photoconductor 11, after the residual toner is removed therefrom by the cleaner 15, returns to a charging step once again, and the foregoing sequence of image forming operations is repeated.

Below each photoconductor, an intermediate transfer unit 50 is arranged. The intermediate transfer unit 50 has the intermediate transfer belt 160, the transfer roller 161, secondary transfer rollers 52 and 53, and an intermediate transfer belt cleaner 51.

Each color toner image formed on the respective photoconductors is transferred onto the intermediate transfer belt 160 in sequence as described above, and after that is conveyed to a secondary transfer unit 54 together with the rotation of the belt. Meanwhile, a print medium such as a sheet that is fed from a feeding cassette by this point is conveyed in a conveyance direction indicated by the arrow symbol by a conveyance roller via a pick-up roller. Then, in the secondary transfer unit 54, the foregoing toner image is transferred onto the print medium by a secondary transfer bias applied between the secondary transfer rollers 52 and 53. Note that the remaining toner transferred onto the intermediate transfer belt 160 is removed and recovered by the intermediate transfer belt cleaner 51. The subsequent stage fixing unit (not shown) fuses, by pressure and heating, the unfixed toner image to fix it onto the surface of the print medium after transfer, and as a result the full color image is formed on the print medium.

Figure 2:
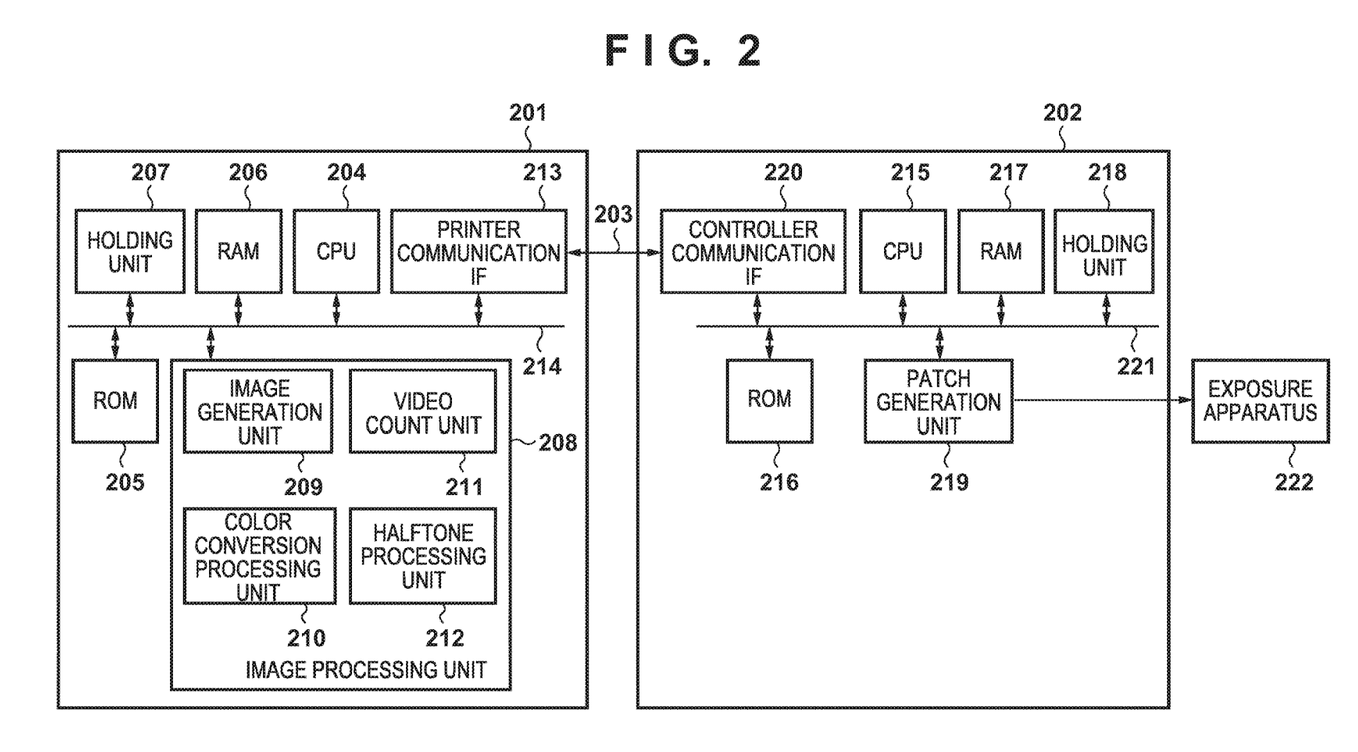
FIG. 2 is a block diagram illustrating a configuration of controllers of the image forming apparatus.

FIG. 2 is a block diagram illustrating a configuration of controllers of the image forming apparatus 101. As illustrated in FIG. 2, the image forming apparatus 101 has a system controller 201 and the print controller 202, and image forming operation of the image forming apparatus 101 is controlled comprehensively. The system controller 201 includes a CPU 204, a ROM 205, and a RAM 206 and the print controller 202 includes a CPU 215, a ROM 216, and a RAM 217. Similarly, the CPU 204, in accordance with an initialization program in the ROM 205, reads a main program from the ROM 205, stores it in the RAM 206, and executes it. Similarly, the CPU 215, in accordance with an initialization program in the ROM 216, reads a main program from the ROM 216, stores it in the RAM 217, and executes it. The RAMS 206 and 217 are also used as work memories of the CPUs 204 and 215 in addition to use for storing programs and data.

An image processing unit 208 performs a sequence of image processing necessary for image formation by the print controller 202. The image processing unit 208 includes an image generation unit 209, a color conversion processing unit 210, a video count unit 211, and a halftone processing unit 212. The image generation unit 209 generates raster image data, by which print processing is possible, from image data to be printed which is received from an external computer apparatus (not shown) or the like, and outputs RGB data and attribute data which indicates data attributes of each pixel. Note, the image generation unit 209 may be given a configuration which handles not only image data which is received from a computer apparatus or the like but also image data for which an original is read in a reading unit comprised in the image forming apparatus 101. The reading unit is a scanner which uses a reading method such as a CCD (Charged Couple Device) or a CIS (Contact Image Sensor), for example. Also, in this case, a processing unit which performs predetermined image processing on image data which is read may also be arranged. Also, rather than a configuration in which a processing unit is arranged in the image forming apparatus 101 itself, configuration may be taken so as to receive image data, for which predetermined image processing has been executed, from an external reading apparatus via an interface (not shown).

The color conversion processing unit 210 converts RGB data which has been generated in the image generation unit 209 into CMYK color space data, for example, to match toner colors, and thereby generates CMYK data. In the present embodiment, image data at this stage is data which indicates an amount of applied CMYK toner (CMYK data), and is expressed by, for example, an 8 bit pixel value in the range from 0 to 255 for a pixel unit. As a specific value, if the pixel value of each color is 0, it indicates non-usage of toner; the density becomes denser as the pixel value becomes larger; and at the pixel value 255, the maximum of 100% density is represented. In the present embodiment, a total value of the amount of applied toner for each color of CMYK expresses the amount of applied toner for the pixel. The CMYK data, for which color conversion processing was performed, is sent to the video count unit 211 and the halftone processing unit 212.

The video count unit 211 counts a total (hereinafter, divided video count value) amount of applied toner for pixels in each divided region (hereinafter, region) divided in the main scanning direction in relation to CMYK data which is generated by the color conversion processing unit 210. Specifically, the video count unit 211 counts a total amount of applied toner for each pixel to calculate a divided video count value in each of a predetermined number of regions of a main scanning region into which a 1 page output image of CMYK data is divided in the main scanning direction. Also, the video count value is calculated for each color of CMYK data. Explanation with regard to the method of calculating the divided video count values of the video count unit 211 will be given later using FIG. 3A and FIG. 3B.

The halftone processing unit 212 performs halftone processing on each color of CMYK data which is outputted from the color conversion processing unit 210. The halftone processing unit 212 is configured to perform screen processing and error diffusion processing, for example. Screen processing performs conversion into N values using multiple predetermined dither matrices and input image data. Also, error diffusion processing is processing that performs a conversion into N values by comparing input image data with a predetermined threshold, and that causes a difference between input image data at that time and the threshold to be diffused into surrounding pixels for which the conversion into N values will be performed thereafter.

In this way, in the present embodiment, a calculation for a divided video count value is performed using 8 bit CMYK data before halftone processing in the video count unit 211. A bit count of image data before halftone processing in the halftone processing unit 212 is larger than a bit count of image data after halftone processing. Accordingly, in the present embodiment, a high precision divided video count value can be acquired by using data whose bit count is larger.

A printer communication interface (IF) unit 213 and a controller communication IF unit 220 are interface units for performing communication between the system controller 201 and the print controller 202 via a controller IF 203. Information which is communicated via the controller IF 203, in addition to image data to be printed, may be a control signal from the system controller 201 or information of a divided video count value which is calculated by the video count unit 211.

A patch generation unit 219 generates patch data for cleaning control in a main scanning region based on divided video count value information which is transferred from the system controller 201 to the print controller 202. The patch generation unit 219 outputs generated patch data for cleaning control to an exposure apparatus 222. The exposure apparatus 222 corresponds to the exposure apparatuses 13, 23, 33, and 43 in FIG. 1A. Note, explanation with regard to a method of generating patch data for cleaning control based on information of a divided video count value will be given in FIG. 5. The exposure apparatus 222 scans the photoconductors 11, 21, 31, and 41 with a laser beam based on the patch data for cleaning control in main scanning region which is inputted from the patch generation unit 219.

Figure 3A:
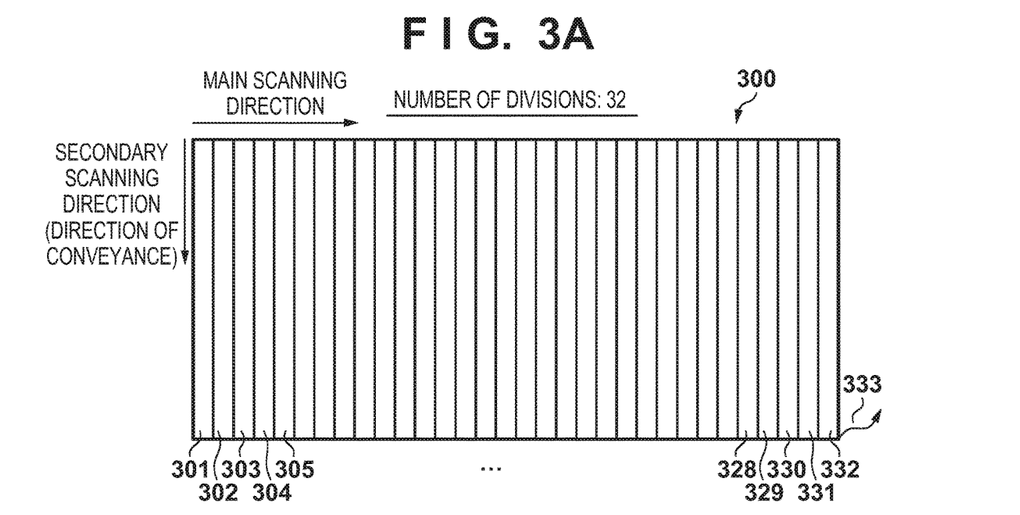
FIG. 3A and FIG. 3B are views for describing a divided video count value calculation.
Figure 3B:
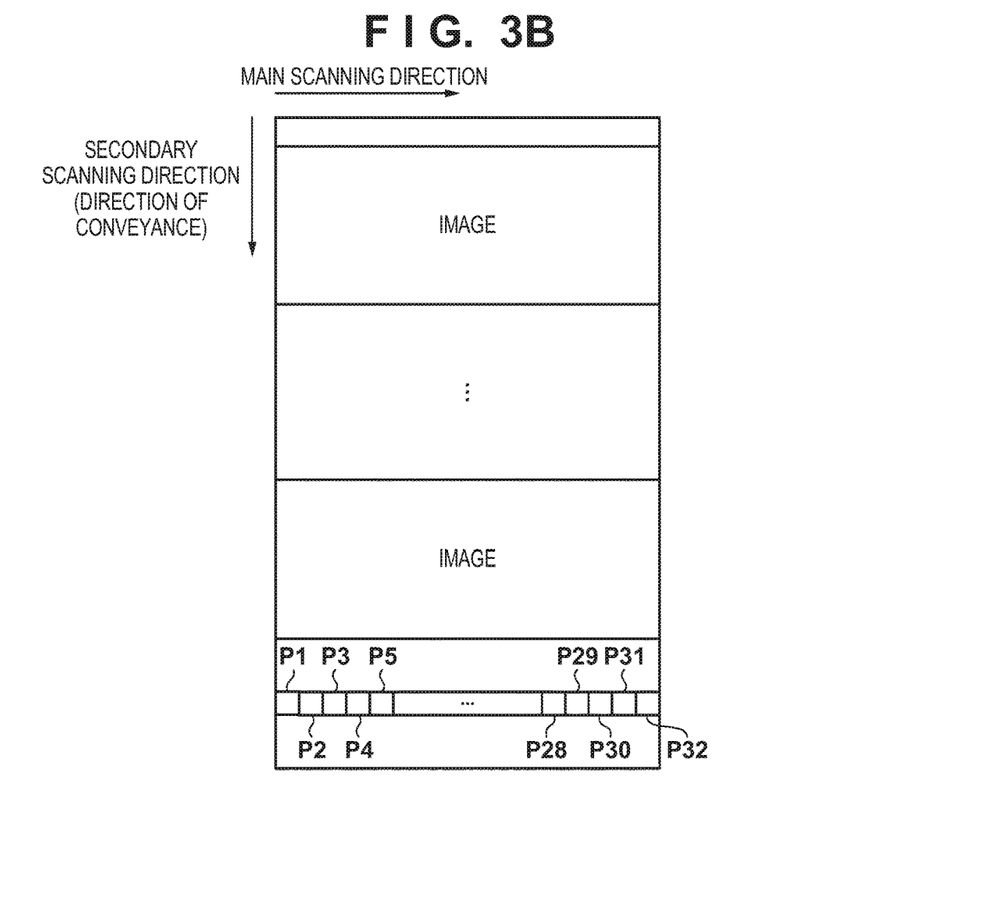

FIG. 3A and FIG. 3B are views for describing a divided video count value calculation method in the image forming apparatus 101. FIG. 3A is a view for describing a method of dividing an input image in which a divided video count value calculation is performed. Here, an example of dividing into 32 regions in a main scanning direction is described, but the number of divisions need not be 32.

Image data 300 is one page of image data on which video count processing is performed, and the width in the main scanning direction corresponds to the width of each photoconductor, and the width in the secondary scanning direction which is orthogonal to the main scanning direction corresponds to a sub scanning width for one page. The video count unit 211, when the image data 300 is inputted, calculates a divided video count value for each of the 32 divided regions 301 to 332 which are divided in the main scanning direction, and stores these in a register in the video count unit 211. Also, the video count unit 211, when the video count processing for the entirety of the image data 300 ends, outputs a page end interrupt signal 333. The CPU 204 of the system controller 201, when the page end interrupt signal 333 is detected, reads out the divided video count values stored in a register in the video count unit 211.

FIG. 3B is a view that represents patch data for cleaning control using the divided video count values of FIG. 3A. Patch data P1 to P32 represents patch data corresponding to the divided regions 301 to 332. The patch data P1 to P32 is added between images printed to a print medium once every predetermined number of pages (for example, 100 pages). Also, the toner amount used for the patch data P1 to P32 is decided in accordance with each divided video count values of the divided regions 301 to 332.

Figure 4:
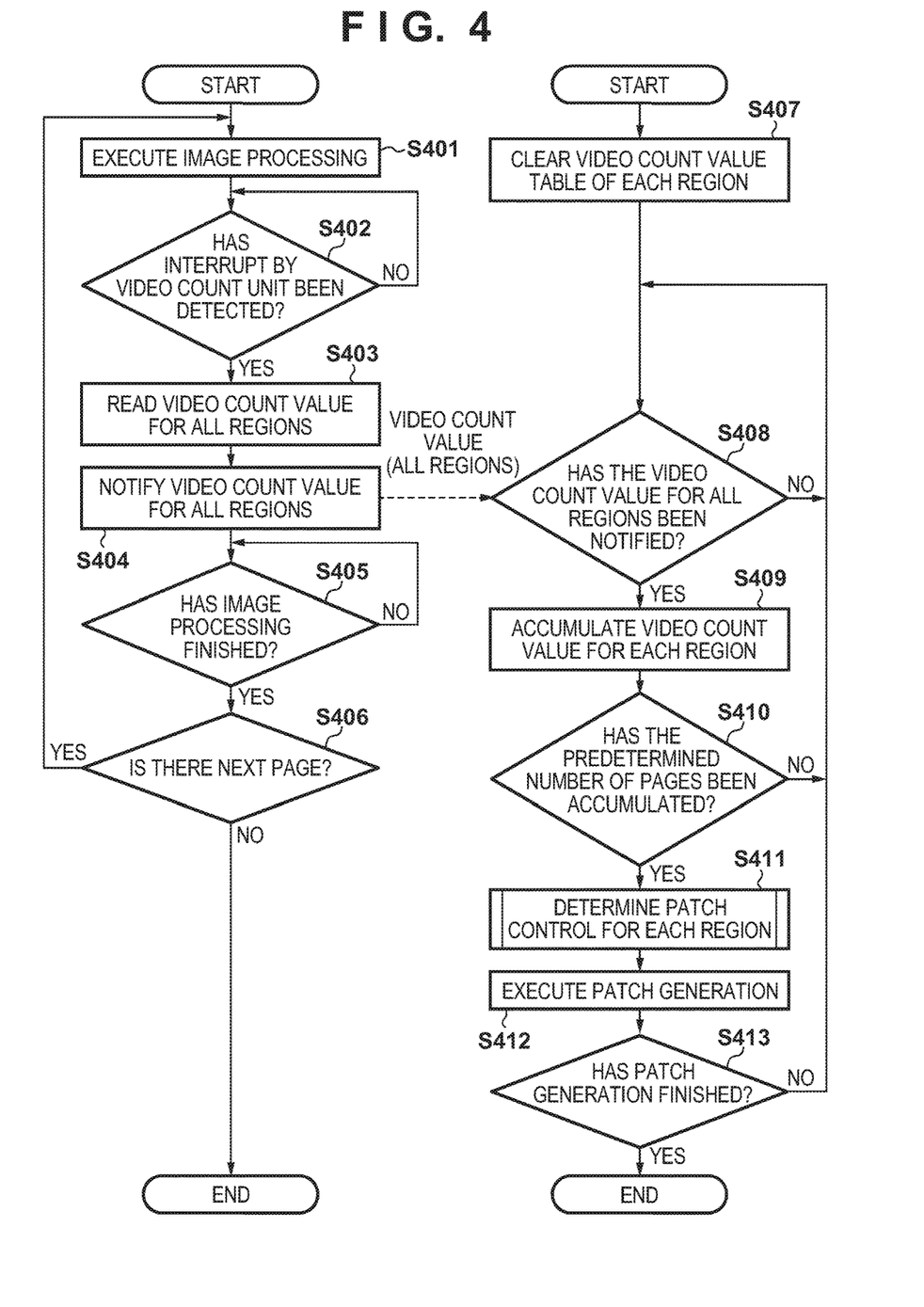
FIG. 4 is a flowchart for illustrating processing for generating a patch for cleaning control.

FIG. 4 is a flowchart that illustrates processing for generating patch data for cleaning control using divided video count values in the system controller 201 and the print controller 202 in the image forming apparatus 101. Processing of step S401 to step S406 is realized by the CPU 204 of the system controller 201 reading a program stored in the ROM 205 into the RAM 206 and executing it, for example. Processing of step S407 to step S412 is realized by the CPU 215 of the print controller 202 reading a program stored in the ROM 216 into the RAM 217 and executing it, for example.

In step S401, the CPU 204 activates the image generation unit 209, the color conversion processing unit 210, the video count unit 211, and the halftone processing unit 212 of the image processing unit 208, and causes processing of each unit described in FIG. 2 to start.

In step S402, the CPU 204 determines whether or not the page end interrupt signal 333 outputted from the video count unit 211 was detected. Until it is determined that the page end interrupt signal 333 is detected, the processing of step S402 is repeated, and when it is determined that the page end interrupt signal 333 is detected, the processing proceeds to step S403.

In step S403, the CPU 204 obtains the divided video count value of each region divided in the main scanning region by reading them from the register of the video count unit 211. In step S404, the CPU 204 notifies the divided video count value of each region read out in step S403 to the print controller 202 via the controller IF 203.

In step S405, the CPU 204 determines whether or not image processing for one page by the image processing unit 208 has completed. Until image processing for one page is determined to have completed, processing of step S405 is repeated, and when it is determined that image processing for one page has completed, the processing proceeds to step S406.

In step S406, the CPU 204 determines whether there is a subsequent page on which to execute image processing. When it is determined that there is a subsequent page, the processing from step S401 is repeated. Meanwhile, when it is determined that there is no subsequent page, the processing of FIG. 4 ends.

Next, processing on the print controller 202 side is described.

In step S407, the CPU 215 clears the contents of the divided video count value table allocated in the RAM 217. In step S408, the CPU 215 determines whether or not the divided video count values of all regions in the main scanning region have been notified from the system controller 201. Until it is determined that the divided video count values of all regions have been notified, the processing of step S408 is repeated, and when it is determined that the divided video count values of all regions have been notified, the processing proceeds to step S409.

In step S409, the CPU 215, for each region, accumulates the divided video count values notified in step S408, and stores the accumulated value in an accumulated value item for the divided video count value in the divided video count value table of the RAM 217.

In step S410, the CPU 215 determines whether or not storage of divided video count accumulated values to the divided video count value table has been performed for a predetermined number of pages. The predetermined number of pages may be, for example, 100 pages, as described previously. When it is determined that it has not been performed for the predetermined number of pages, the processing of step S408 is repeated, and when it is determined that it has been performed for the predetermined number of pages, the processing proceeds to step S411.

In step S411, the CPU 215, based on the accumulated value of the divided video count values stored in the divided video count value table, executes processing for determining patch data generation control for each divided region. The processing for determining patch data generation control is described later in FIG. 5. In step S412, the CPU 215, based on the result of determining the patch data generation control for each region, instructs patch data generation processing execution to the patch generation unit 219. Here, the result of determining the patch data generation control is information indicating whether or not to generate patch data.

In step S413, the CPU 215 determines whether or not the above described patch data generation processing has ended. When it is determined that the patch data generation processing has not ended, the processing from step S408 is repeated, and when it is determined that the patch data generation processing has ended, the processing of FIG. 4 ends.

Figure 5:
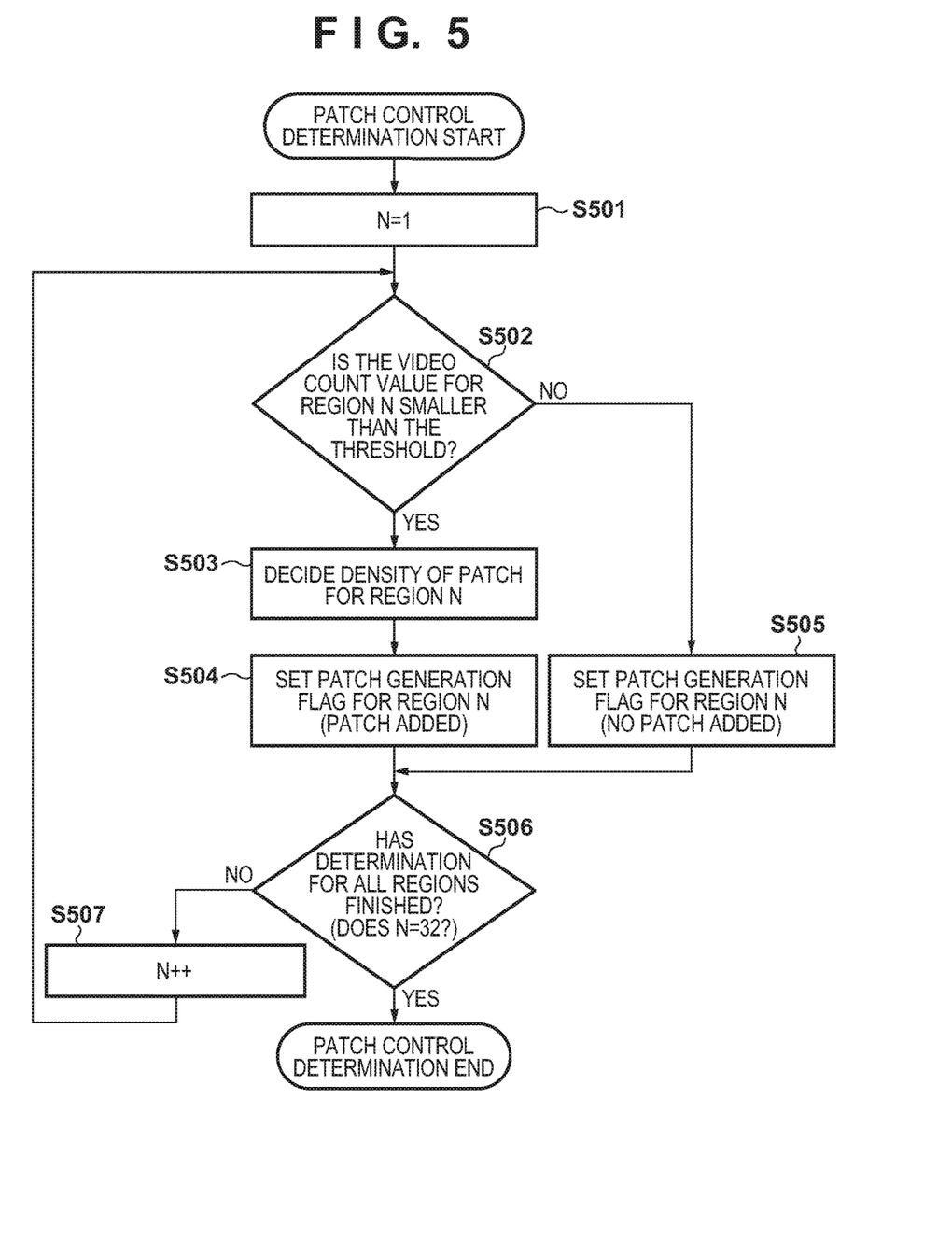
FIG. 5 is a flowchart illustrating processing of step S411.

FIG. 5 is a flowchart illustrating the processing for determining patch data generation control in step S411 of FIG. 4.

In step S501, the CPU 215 sets a variable N, which indicates the region whose divided video count value is to be obtained, to 1. In step S502, the CPU 215 determines whether or not the divided video count value of the region (region N) corresponding to the variable N is smaller than a predetermined threshold. When it is determined that the divided video count value is smaller than a predetermined threshold, the processing proceeds to step S503. Meanwhile, when it is determined that the divided video count value is greater than or equal to the predetermined threshold, the processing proceeds to step S505.

In step S503, the CPU 215 decides the density of the patch data corresponding to the region N. Specifically, for the density of the patch data corresponding to the region N, a difference between the divided video count value and the threshold is calculated, and an amount of applied toner (%) for patch data is decided in accordance with the calculated difference. By this, for example, it is possible to decide the density of the patch data for cleaning control corresponding to an amount that is insufficient out of the total amount of applied toner used in print processing of a predetermined page in relation to the total amount of applied toner necessary for cleaning control (for example, 2%), for example. In step S504, the CPU 215 sets a patch generation flag to 1. Here, the patch generation flag being 1 represents that patch data is added to the region N. On the other hand, in step S505, the CPU 215 sets a patch generation flag to 0. Here, the patch generation flag being 0 represents that patch data is added to the region N.

In step S506, the CPU 215 determines whether or not the above described patch data generation determination has ended for all regions (for example, N=32). When it is determined that the patch data generation determination has not ended for all regions, the CPU 215, in step S507, increments the variable N and repeats processing from step S502. Meanwhile, when it is determined that the patch data generation determination has ended for all regions, the processing of FIG. 5 ends.

Figure 6A:
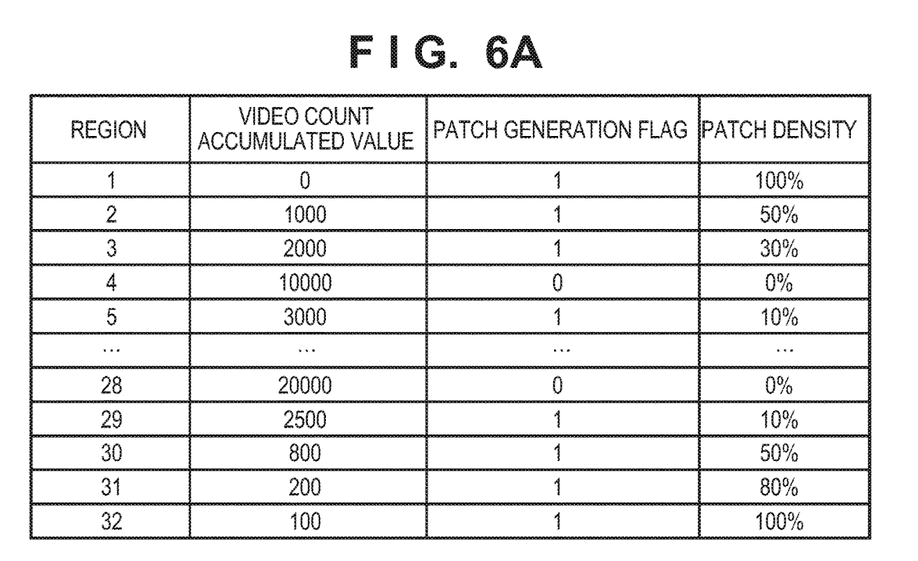
FIG. 6A and FIG. 6B are views for describing generation of patch data.
Figure 6B:
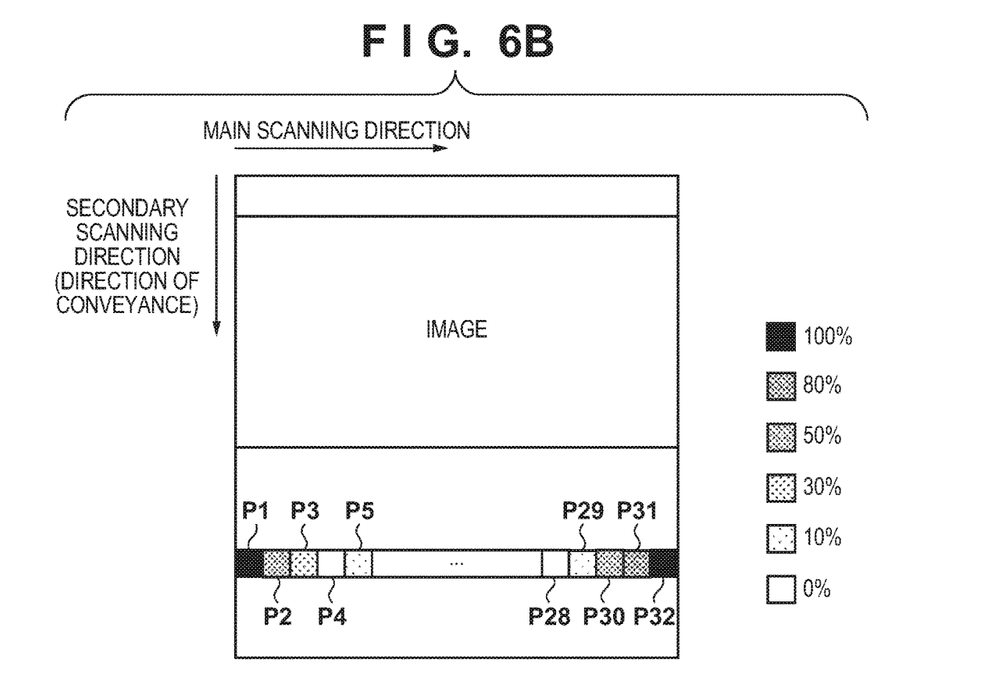

FIG. 6A and FIG. 6B are views for describing patch data generation processing that uses a divided video count value.

FIG. 6A illustrates an example of the results of the determination of the patch data generation processing based on the processing of FIG. 5.

As illustrated in FIG. 6A, accumulated values of the divided video count values are stored respectively for 32 divided regions in the divided video count value table. The patch generation flag, which is set as the result of the threshold determination against the accumulated value of the divided video count value for each region, is also stored.

For example, when the threshold is 4000, the patch generation flag is set to 0 for regions N=4 and N=28, whose divided video count value accumulated value is greater than or equal to the threshold, and control is performed such that the density of the patch data is 0% and patch data is not added. Meanwhile, because the divided video count value accumulated values of the other regions are lower than the threshold, the patch generation flag is set to 1, and a patch density of 10% to 100% is set for each region in accordance with the difference between the threshold and the divided video count value. In the present embodiment, 6 stages of patch densities of, for example, 0%, 10%, 30%, 50%, 80%, and 100% are used. The relationship between the difference and the patch density may be established as appropriate.

As with region 1 and region 32, for regions with a small divided video count value accumulated value, because the amount of applied toner required for image data printing is small, the patch density for cleaning control is set to the maximum application amount of 100%. Also, as with region 5 and region 29, for regions whose divided video count value accumulated value is large, a patch density of 10% according to the amount of applied toner required for printing image data is set.

FIG. 6B is a view that illustrates a result of adding patch data according to the results of the determination of FIG. 6A. As illustrated in FIG. 6B, the patch data P1 to P32 is added by the density decided based on the divided video count accumulated value.

As described above, according to the present embodiment, a generation of patch data in the print controller 202 is controlled based on the divided video count value using image data before halftone processing which is calculated in the system controller 201. With this, control for addition of high precision patch data for cleaning becomes possible.

[Second Embodiment]

In the first embodiment, the divided video count values for all regions are notified to the print controller 202 at a timing of a page end interrupt of video count processing. In the present embodiment, divided video count values are notified, dividing over a predetermined number of regions, a communication data amount in the controller IF 203 is reduced, and thereby print processing efficiency is improved. Hereinafter, description will be given of points that differ from the first embodiment.

Figure 7:
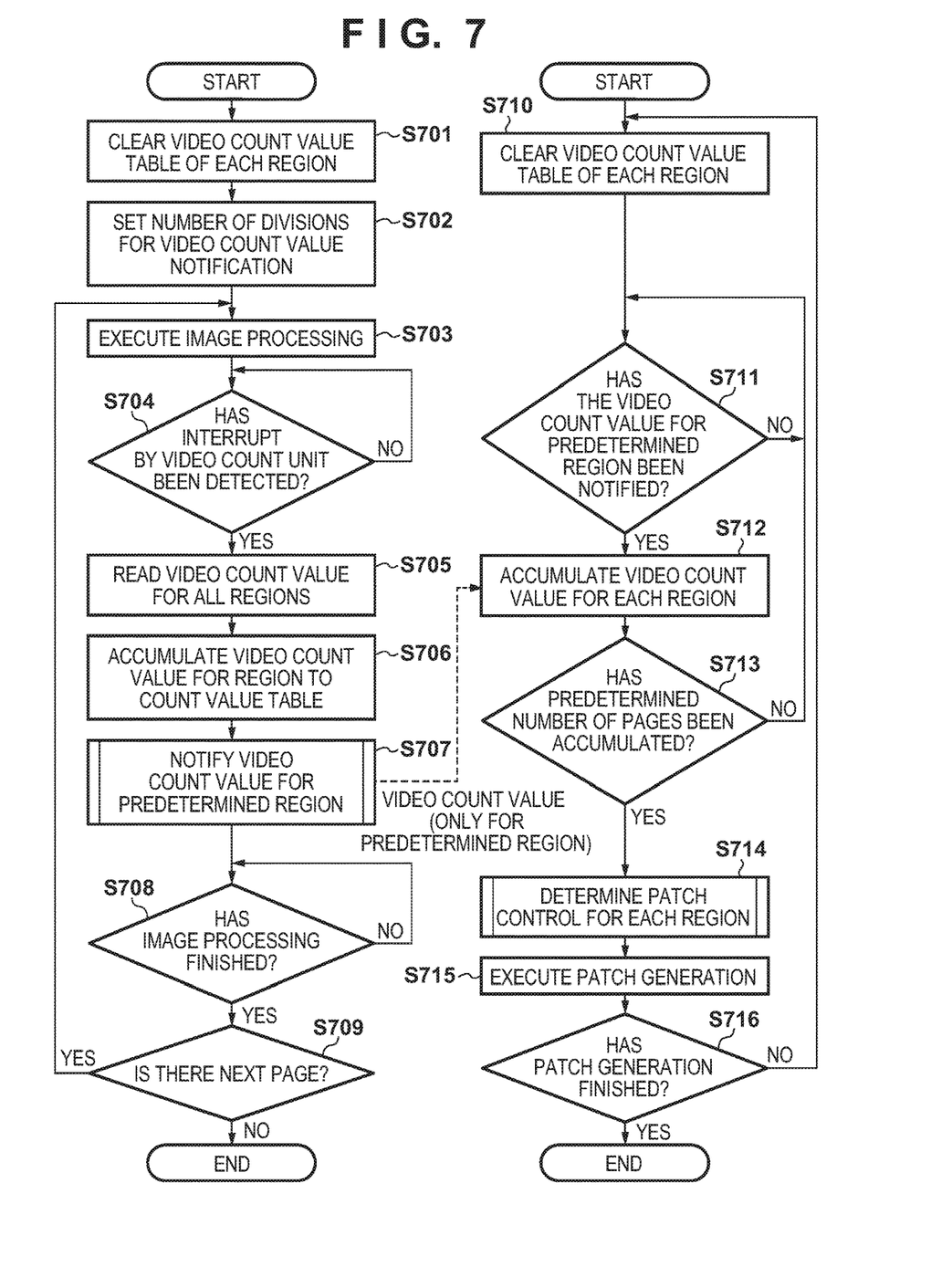
FIG. 7 is a flowchart for illustrating processing for patch generating for cleaning control.

FIG. 7 is a flowchart that illustrates processing for generating patch data for cleaning control using divided video count values in the system controller 201 and the print controller 202 in the image forming apparatus 101 in the present embodiment. Processing of step S701 to step S709 is realized by the CPU 204 of the system controller 201 reading a program stored in the ROM 205 into the RAM 206 and executing it, for example. Also, processing of step S710 to step S716 is realized by the CPU 215 of the print controller 202 reading a program stored in the ROM 216 into the RAM 217 and executing it, for example.

In step S701, the CPU 204 clears the contents of the divided video count value table in the RAM 206. In step S702, the CPU 204 sets a number of divisions for notification of the divided video count values to be notified from the system controller 201 to the print controller 202. For example, in a case where the number of divided regions in main scanning region is 32 and the number of divisions for notification is set as 2, a notification of divided video count values is performed for every 16 divided regions.

Because steps from step S703 to step S705 are the same as the steps from step S401 to step S403 in FIG. 4, explanation is omitted.

In step S706, the CPU 204 stores the divided video count values for all regions, which are read from the register in the video count unit 211, to the divided video count value table of the RAM 206. In step S707, the CPU 204 selects the divided video count values of a predetermined number of regions out of the divided video count values for all regions which are stored in the RAM 206 in step S706 and notifies them to the print controller 202 via the controller IF 203. Note, the predetermined number of regions is 16 as described above, for example. An explanation with regard to processing for notifying the divided video count values of the predetermined number of regions will be given later in FIG. 8.

Next, processing on the print controller 202 side is described.

Because step S710 is the same as step S407 in FIG. 4, explanation is omitted.

In step S711, the CPU 204 determines whether or not the divided video count values of the predetermined number of regions have been notified from the system controller 201. Until it is determined that the divided video count values of the predetermined number of regions have been notified, the processing of step S711 is repeated, and when it is determined that the divided video count values of the predetermined number of regions have been notified, the processing proceeds to step S712.

Because steps from step S712 to step S716 are the same as the steps from step S409 to step S413 in FIG. 4, explanation is omitted.

Figure 8:
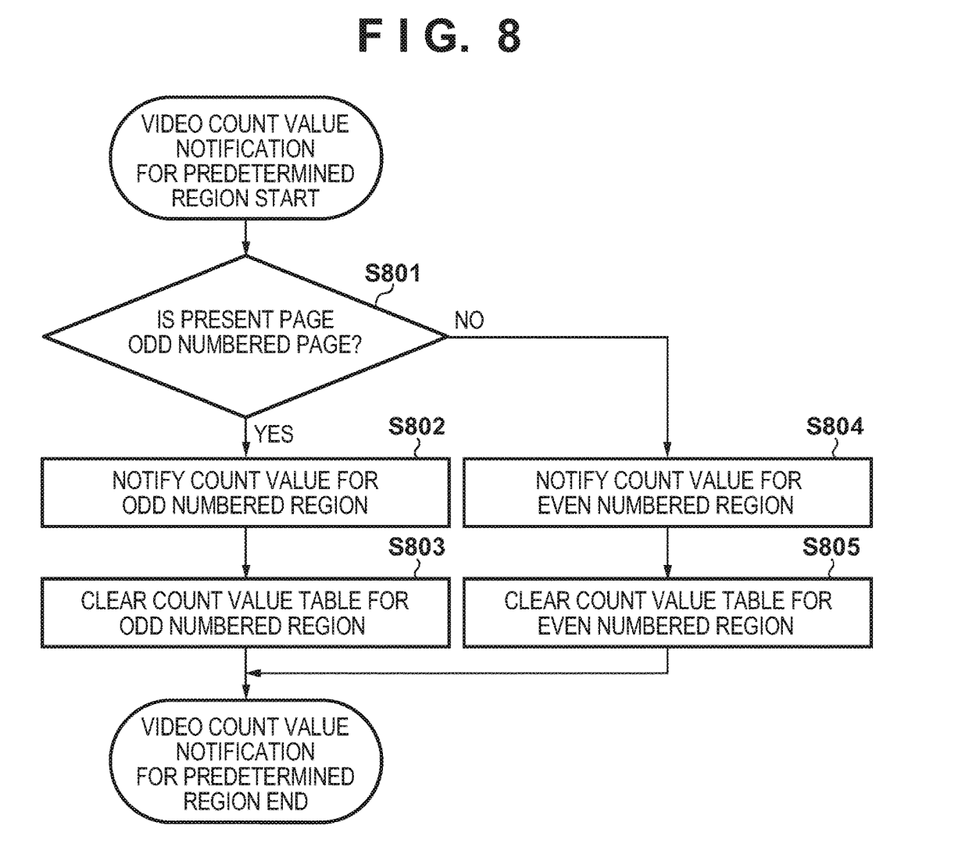
FIG. 8 is a flowchart for illustrating divided video count value notification processing.

FIG. 8 is a flowchart for describing processing for notifying the divided video count values of the predetermined number of regions in step S707 in FIG. 7. Below, explanation will be given with an example of a case in which a number of divisions for notification of the divided video count values is 2.

In step S801, the CPU 204 determines whether a page which is currently being processed is an odd page or an even page. In a case in which the page which is currently being processed is determined to be an odd page, the processing proceeds to step S802, and in a case in which the page which is currently being processed is determined to be an even page, the processing proceeds to step S804.

In step S802, the CPU 204 sets a count value notification flag for a divided video count value of an odd number region in a video count value table for all regions which is generated in step S706 as 1 which represents "notify". Also, it sets the count value notification flag for even regions as 0 which represents "do not notify". Then, the CPU 204 notifies an accumulated value of the divided video count values with regard to only odd regions to the print controller 202 based on the count value notification flag which is set. In step S803, the CPU 204 clears the accumulated values of divided video count values of the odd regions among all regions in the video count value table.

Meanwhile, in step S804, the CPU 204 sets a count value notification flag of the divided video count value table of even numbered regions in a video count value table for all regions which is generated in step S706 as 1 which represents "notify". Also, it sets the count value notification flag for odd numbered regions as 0 which represents "do not notify". Then, the CPU 204 notifies an accumulated value of the divided video count values with regard to only even numbered regions to the print controller 202 based on the count value notification flag which is set. In step S805, the CPU 204 clears the accumulated values of divided video count values of the even numbered regions among all regions in the video count value table.

Figure 9A:
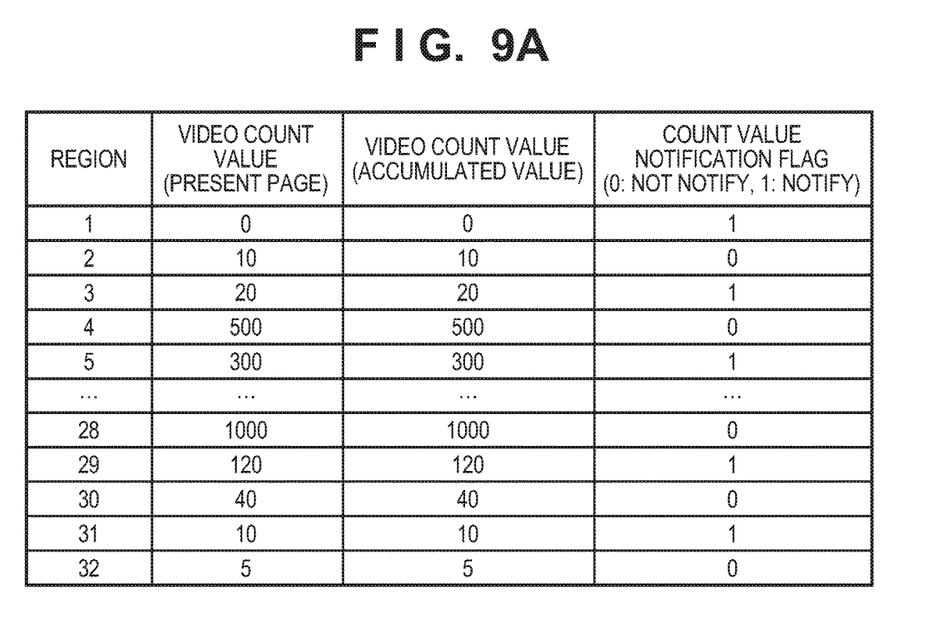
FIG. 9A and FIG. 9B are views for illustrating a divided video count value table.
Figure 9B:
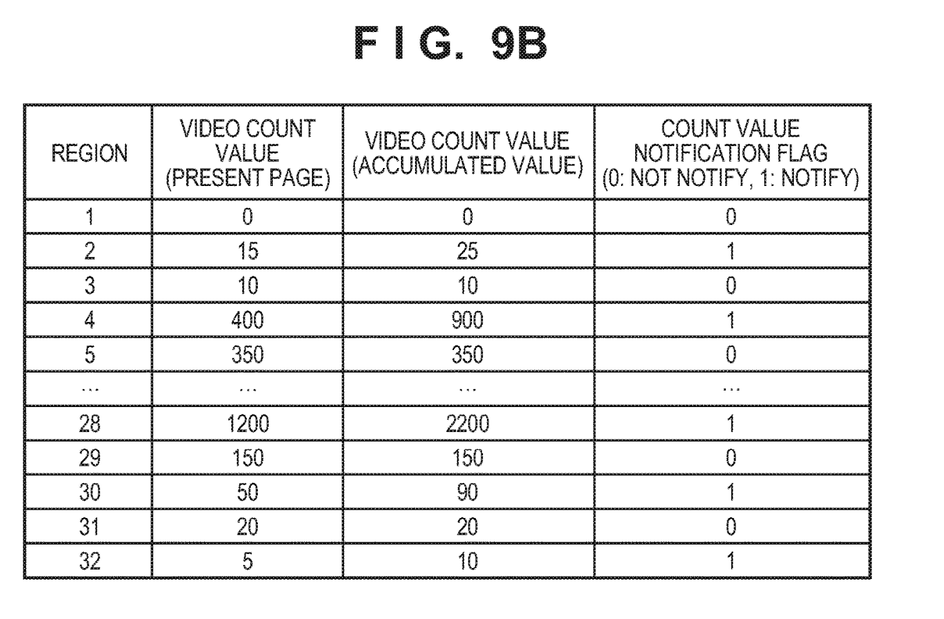

FIG. 9A and FIG. 9B are views indicating examples of the divided video count value table according to the processing for notifying the divided video count values of the predetermined number of regions in FIG. 8. FIG. 9A indicates the divided video count value table in a case in which the system controller 201 is currently processing a first page (an odd page). When the first page is being processed, the divided video count values for all regions which are calculated in the video count processing of input image data of the first page are stored in items for the divided video count value for the current page and the divided video count value accumulated value. Also, the count value notification flag for odd numbered regions is set as 1, and the count value notification flag for even numbered regions is set as 0.

Meanwhile, FIG. 9B indicates the divided video count value table in a case in which the system controller 201 is currently processing a second page (an even page). When the second page is being processed, in the divided video count value table, the divided video count values for all regions which are calculated in the video count processing of input image data of the second page are stored an item for the divided video count value for the current page. Also, in the divided video count value accumulated value item for odd numbered regions, the divided video count values of the second page are stored, and in the divided video count value accumulated value item for even numbered regions, divided video count value accumulated values for the first page and the second page are stored. For example, in the divided video count value item of region 2 in FIG. 9B, "15" which is calculated for the second page is stored. Also, in the divided video count value accumulated value item for region 2, the accumulated value "25" of "10" which is the divided video count value for region 2 in FIG. 9A and "15" which is the divided video count value for region 2 in FIG. 9B is stored. In FIG. 9B, the count value notification flag for even numbered regions is set as 1, and the count value notification flag for odd numbered regions is set as 0.

As described above, in the present embodiment, the divided video count values which are calculated in the system controller 201 are divided into a predetermined number of regions, and some of the divided video count values out of all regions are notified to the print controller 202. In other words, the divided video count values for all regions are notified by complementarily notifying those of odd pages and those of even pages as illustrated in FIGS. 9A and 9B. As a result, in communication between the system controller 201 and the print controller 202, all communication data of divided video count value is maintained, and the communication data amount for a single notification can be reduced by half. Accordingly, in addition to improving efficiency of print processing, it becomes possible to control addition of high precision patch data for cleaning.

Also, in the present embodiment, though number of divisions of notification was made to be 2 when the divided video count values are notified to the print controller 202, configuration may be taken such that the notification is executed using a number of divisions selected as appropriate. For example, in a case in which the number of divisions for notification of the divided video count value is 3, notification to the print controller 202 is executed for regions that each amount to one third of all regions (three times (11 regions; 11 regions; and 10 regions) in the case where the total number of regions N=32).

Also, configuration may be such that a setting for the number of divisions for notification of the divided video count values is changed in accordance with the processing speed in the processing unit (photoconductor rotation speed). For example, configuration may also be taken such that in a case where the rotational drive speed of the photoconductor is a low speed, notification is performed for each page without performing notification division, and in the case of a medium speed, notification is performed every 2 pages with a notification division into 2, and at a high speed notification is performed every 3 pages with a notification division into 3. Also, a setting for the number of divisions of notification of the divided video count values may be changed in accordance with the type of print media (normal paper, thin paper, thick paper or the like). For example, configuration may also be taken such that when the print medium is an A4 size, notification is performed every other page with the number of divisions of notification being 2, and in the case of a long size, notification is performed every page without performing notification divisions. As a result, an effect on print processing of communication data in the controller IF 203 can be prevented from fluctuating greatly due to changes in the rotational drive speed of the photoconductor and the size of the print media.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-215564, filed Nov. 2, 2016, which is hereby incorporated by reference herein in its entirety.

What is claimed is:

1. An image forming apparatus comprising:
   a first controller including:
   a first processor configured to, based on print target image data, obtain information indicating toner amount supplied to a photoconductor by a developer unit to form an image,
   wherein an image forming area along a scanning direction of a laser that exposes the photoconductor is divided into a plurality of regions, and the obtained information includes at least information indicating toner amount on one of the plurality of regions; and
   a second controller including:
   a generation unit configured to, based on the information obtained by the first processor, generate patch data for cleaning the photoconductor, and
   a second processor configured to control the developer unit to execute image formation, and to execute image formation based on the patch data generated by the generation unit,
   wherein the information indicating toner amount on a part of the plurality of regions is transmitted from the first controller to the second controller.

2. A control method executed in an image forming apparatus, the method comprising:
   based on print target image data, obtaining, with a first controller, information indicating toner amount supplied to a photoconductor by a developer unit to form an image, wherein an image forming area along a scanning direction of a laser that exposes the photoconductor is divided into a plurality of regions, and the obtained information includes at least information indicating toner amount on one of the plurality of regions;
   based on the obtained information, generating, with a second controller, patch data for cleaning the photoconductor; and
   controlling, with the second controller, the developer unit to execute image formation, and to execute image formation based on the generated patch data,
   wherein the information indicating toner amount on a part of the plurality of regions is transmitted from the first controller to the second controller.

3. A non-transitory computer-readable storage medium storing a program for causing a computer to function to:
   based on print target image data, obtain, with a first controller, information indicating toner amount supplied to a photoconductor by a developer unit to form an image, wherein an image forming area along a scanning direction of a laser that exposes the photoconductor is divided into a plurality of regions, and the obtained information includes at least information indicating toner amount on one of the plurality of regions;
   based on the obtained information, generate, with a second controller, patch data for cleaning the photoconductor; and
   control, with the second controller, the developer unit to execute image formation, and to execute image formation based on the generated patch data,
   wherein the information indicating toner amount on a part of the plurality of regions is transmitted from the first controller to the second controller.

4. The image forming apparatus according to claim 1, wherein the generation unit decides an application amount of toner for cleaning of the photoconductor in accordance with a total amount of toner for image forming of print target image data in a secondary scanning direction which is orthogonal to the scanning direction, and generates the patch data based on the decided application amount of toner.

5. The image forming apparatus according to claim 4, wherein the application amount of toner for cleaning the photoconductor is decided to be smaller the larger the total amount of toner is, and is decided to be larger the smaller the total amount of toner is.

6. The image forming apparatus according to claim 1, wherein in a case where a page corresponding to the image data is an odd page, the information indicating toner amount on a part of the plurality of regions is transmitted from the first controller to the second controller and in a case where a page corresponding to the image data is an even page, the information indicating toner amount on another part of the plurality of regions is transmitted from the first controller to the second controller.

7. The image forming apparatus according to claim 1, wherein the print target image data is RGB data.

8. The image forming apparatus according to claim 1, wherein the first processor obtains the information indicating toner amount corresponding to each color of CMYK.

9. The image forming apparatus according to claim 1 wherein the first controller further includes a halftone processing unit configured to execute halftone processing on the image data, and
   wherein the first processor obtains, before the halftone processing of the target image is executed, the information indicating toner amount used for image forming of the target image data.

* * * * *